(12) United States Patent  (10) Patent No.: US 8,750,087 B2
Kim et al.  (45) Date of Patent: Jun. 10, 2014

(54) OPTICAL PICKUP DEVICE

(75) Inventors: Ki-bok Kim, Suwon-si (KR); Eun-goo Kim, Suwon-si (KR); Hyun-wook Nam, Suwon-si (KR); Jung-bae Oh, Suwon-si (KR); Ji-sun Ahn, Seoul (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 12/858,565

(22) Filed: Aug. 18, 2010

(65) Prior Publication Data

US 2011/0044155 A1 Feb. 24, 2011

(30) Foreign Application Priority Data

Aug. 19, 2009 (KR) .................. 10-2009-0076733

(51) Int. Cl.
*G11B 7/135* (2012.01)
(52) U.S. Cl.
USPC ............. 369/112.23; 369/112.29; 369/110.02
(58) Field of Classification Search
USPC ............ 369/112.01, 112.23, 112.29, 115, 99, 369/110.02
See application file for complete search history.

(56) References Cited

U.S. PATENT DOCUMENTS

| 8,004,955 | B2 * | 8/2011 | Tashiro et al. | 369/112.23 |
|---|---|---|---|---|
| 2003/0117917 | A1 * | 6/2003 | Shindo | 369/53.2 |
| 2005/0094537 | A1 * | 5/2005 | Ikenaka et al. | 369/112.05 |
| 2005/0105446 | A1 * | 5/2005 | Sakamoto et al. | 369/112.01 |
| 2005/0201248 | A1 * | 9/2005 | Kitabayashi et al. | 369/112.01 |
| 2005/0249097 | A1 * | 11/2005 | Hashimura et al. | 369/112.01 |
| 2006/0164953 | A1 * | 7/2006 | Kim et al. | 369/112.01 |
| 2007/0104071 | A1 * | 5/2007 | Asoma | 369/112.05 |
| 2009/0010142 | A1 * | 1/2009 | Komma | 369/112.23 |
| 2009/0196149 | A1 * | 8/2009 | Atarashi et al. | 369/112.23 |

* cited by examiner

*Primary Examiner* — Thomas Alunkal
(74) *Attorney, Agent, or Firm* — NSIP Law

(57) ABSTRACT

An optical pickup device corresponding to a plurality of media is provided. The optical pickup device includes a light emitting system and a light receiving system including a plurality of light sources and a light transmission system shared by the light emitting system and the light receiving system, configured to irradiate light on a medium, and receive light reflected from the medium. The light transmission system irradiates light from the light emitting system to be appropriately focused on the medium, receives light reflected from the medium, and transports light to the light receiving system. The light transmission system includes one beam splitter corresponding to the light emitting system and the light receiving system and a position-changing collimating lens shared to correspond to a plurality of media. The position-changing collimating lens is disposed between the beam splitter and the medium, the position being controlled according to optical characteristics of the media.

23 Claims, 8 Drawing Sheets

OPTICAL PICKUP DEVICE

CROSS-REFERENCE TO RELATED APPLICATION(S)

This application claims the benefit under 35 U.S.C. §119(a) of Korean Patent Application No. 10-2009-0076733, filed on Aug. 19, 2009, in the Korean Intellectual Property Office, the disclosure of which is incorporated herein by reference for all purposes.

BACKGROUND

1. Field

The following description relates to an optical pickup device, and more particularly, to an optical pickup device that corresponds to a plurality of media.

2. Description of the Related Art

Optical pickup devices that correspond to a plurality of media are designed to be applied to conventional compact discs (CDs), digital versatile discs (DVDs), Blu-ray Discs (BDs), and the like.

Generally, an optical system of optical pickup devices that correspond to a plurality of media may include an objective lens corresponding to CDs/DVDs and an objective lens corresponding to BDs. The optical system may further include a beam splitter, a collimator, and a mirror. However, due to characteristics of the structure of the optical system, an optical distance between optical systems corresponding to CDs/DVDs and an optical distance between optical systems corresponding to BDs are different from each other. Thus, in order to focus light on a medium by using an optical system that supports the medium, an optical distance required by the optical system should be obtained. Thus, conventional optical pickup devices that correspond to a plurality of media have a structure in which an independent optical system corresponding to CDs/DVDs and an independent optical system corresponding to BDs are simply combined in one structure.

In addition, since conventional optical pickup devices may include all of the optical systems described above, the optical pickup devices may include a relatively large amount of components compared to conventional optical pickup devices for CDs/DVDs or conventional optical pickup devices for BDs. Thus, it may be difficult to design the conventional optical pickup devices, and costs may increase due to an increase in the number of components.

SUMMARY

In one general aspect, there is provided an optical pickup device, including: a light emitting system including a plurality of light sources respectively corresponding to a plurality of media, a light receiving system including a photodetector configured to convert light reflected from the plurality of media into an electrical signal, and a light transmission system shared by the light emitting system and the light receiving system, the light transmission system configured to: direct light from the light emitting system toward a medium, and direct light reflected from the medium toward the light receiving system, the light transmission system including: a first beam splitter corresponding to the light emitting system and the light receiving system, and a position-changing collimating lens of which is repositioned according to the plurality of media.

The optical pickup device may further include that: the light emitting system includes a plurality of optical systems respectively corresponding to different media, and one of the plurality of optical systems includes a coupling lens configured to adjust magnification.

The optical pickup device may further include that the plurality of optical systems include a compact disc/digital versatile disc (CD/DVD) optical system and a Blu-ray Disc (BD) optical system.

The optical pickup device may further include that the coupling lens is disposed in the BD optical system.

The optical pickup device may further include that: the light emitting system includes a second beam splitter shared by the optical systems, and the optical systems are configured to transmit light to the first beam splitter via the second beam splitter.

The optical pickup device may further include that: a monitor photodetector is disposed at a side of the second beam splitter, and the second beam splitter is further configured to: direct most of light from the optical systems toward the first beam splitter, and allow a part of light to be incident on the monitor photodetector.

The optical pickup device may further include that: an optical axis of the collimating lens is disposed parallel to the medium, and an optical path refraction mirror is further disposed between an objective lens assembly and the collimating lens.

The optical pickup device may further include: an optical path refraction mirror disposed between an objective lens assembly and the collimating lens, wherein an optical axis of the collimating lens is disposed parallel to the medium.

In another general aspect, there is provided an optical pickup device, including: an objective lens assembly including a plurality of objective lenses respectively corresponding to a plurality of media, a plurality of light sources respectively corresponding to the plurality of media, a photodetector configured to detect light reflected from the medium, a collimating lens disposed on an optical path between the objective lens and the light sources, the positioning of the collimating lens on an optical axis being adjustable, a first beam splitter disposed between the collimating lens and the light sources, the first beam splitter configured to: direct light reflected from the media toward the photodetector, and direct light from the light sources toward the collimating lens, and a second beam splitter disposed between the first beam splitter and the light sources, the second beam splitter configured to direct light from the light sources toward the first beam splitter.

The optical pickup device may further include that: a monitor photodetector is disposed at a side of the second beam splitter, and the second beam splitter is further configured to direct a part of light from the light sources toward the monitor photodetector.

The optical pickup device may further include that a coupling lens configured to adjust an optical magnification is disposed between one of the plurality of light sources and the second beam splitter.

The optical pickup device may further include an optical path refraction mirror disposed between an objective lens assembly and the collimating lens.

The optical pickup device may further include that the plurality of light sources includes a light source for compact discs/digital versatile discs (CDs/DVDs) and a light source for Blu-ray Discs (BDs).

The optical pickup device may further include that a coupling lens configured to adjust magnification is disposed between the light source for DVDs and the second beam splitter.

Other features and aspects may be apparent from the following detailed description, the drawings, and the claims.

Figure 1:
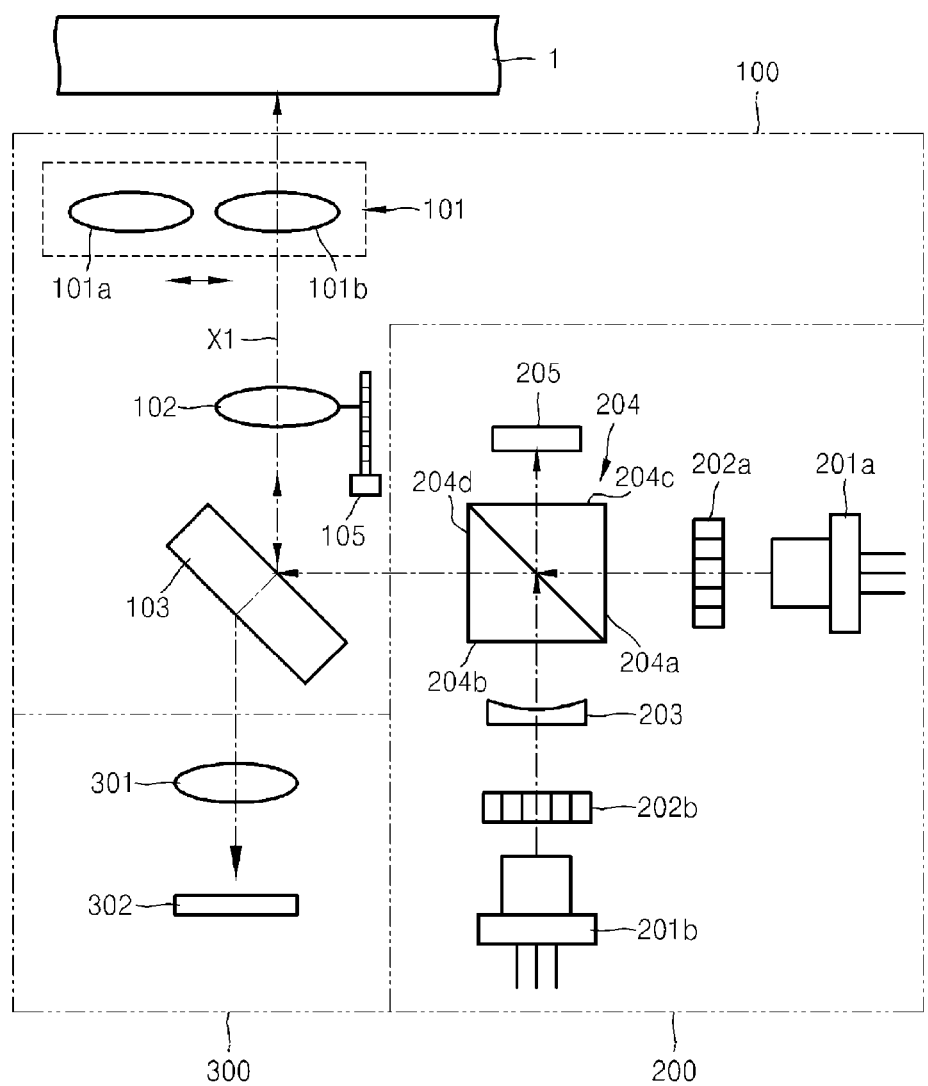
FIG. 1 is a diagram illustrating a schematic structure of an example of an optical pickup device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates a schematic structure of an example of an optical pickup device. Referring to the example in FIG. 1, the optical pickup device includes a light transmission system 100 that corresponds to a medium 1, a light emitting system 200 configured to supply light for reproducing data from the medium 1 and/or for writing data into the medium 1, and a light receiving system 300 configured to receive light reflected from the medium 1 and generate an electrical reproduction signal to reproduce data from the medium 1.

The light transmission system 100 is disposed on an optical axis X1. The light transmission system 100 includes an objective lens assembly 101 that corresponds to the medium 1, a first beam splitter 103 having a plate-shaped structure, a collimating lens 102 disposed between the objective lens assembly 101 and the first beam splitter 103, and a collimating lens transfer unit 105 that controls positioning of the collimating lens 102 on the optical axis X1. The objective lens assembly 101 includes first and second objective lenses 101a and 101b that correspond to a plurality of media.

The first objective lens 101a corresponds to CDs/DVDs, and the second objective lens 101b corresponds to BDs. The objective lens assembly 101 including the first and second objective lenses 101 a and 101 b moves in a reciprocating manner to dispose the first objective lens 101a or the second objective lenses 101b on the optical axis X1 according to the type of media upon which data is to be recorded. The light transmission system 100 directs light from the light emitting system 200 toward the medium 1 and directs light reflected from the medium 1 toward the light receiving system 300.

The collimating lens 102 moves in a reciprocating manner along the optical axis X1 within a predetermined range that is set by the collimating lens transfer unit 105 to obtain an appropriate focal length according to the type of media. This is further described below.

The first beam splitter 103 is configured to reflect light emitted from the light emitting system 200 in a direction in which the medium 1 is disposed, and transmit light reflected from the medium 1 onto the light receiving system 300.

The light receiving system 300 includes a photodetector 302 on which light reflected from the medium 1 is incident, and a sensing lens 301 that is configured to focus the light on the photodetector 302 to an appropriate size.

The light emitting system 200 may include a plurality of light sources corresponding to the medium 1. For example, the light emitting system 200 may include a first light source 201a for CDs/DVDs and a second light source 201b for BDs, as shown in FIG. 1. The first light source 201a for CDs/DVDs and the second light source 201b for BDs respectively irradiate light toward first and second incidence surfaces 204a and 204b of a second beam splitter 204 having a cubic structure. The second beam splitter 204 includes the first and second incidence surfaces 204a and 204b, which are adjacent surfaces, and adjacent first and second emission surfaces 204c and 204d. Light that is emitted by the first and second light sources 201a and 201b respectively onto the first and second incidence surfaces 204a and 204b mostly proceeds toward the first beam splitter 103 via the first emission surface 204d. A first diffraction element 202a for CDs/DVDs and a second diffraction element 202b for BDs are respectively disposed between the first beam splitter 103 and the first light source 201a and between the first beam splitter 103 and the second light source 201b. A monitor photodetector 205 is disposed in front of the first emission surface 204c of the second beam splitter 204 and may detect a part of light emitted to the second beam splitter 204.

A coupling lens 203 is disposed between the second light source 201b and the second incidence surface 204b, may adjust an optical distance between the second light source 201b and the medium 1 and allow light from the second light source 201b to be incident on the collimating lens 102 at an appropriate angle. The coupling lens 203 complements movement of the position of the collimating lens 102 according to the type of media and is applied to BDs, so that it may reduce a moving distance between a reference position and the collimating lens 102.

The optical pickup device having the structure described above and with respect to FIG. 1 may correspond to three types of media, for example, CDs, DVDs and BDs. Accordingly, the position of the collimating lens 102 on the optical axis X1 may be adjusted. In particular, the coupling lens 203 may be further applied to BDs so that efficiently corresponds to BDs. This structure may be relatively simple compared to a structure of a conventional optical pickup device that corresponds to a plurality of media and has independent optical systems. That is, in one example, there is a light source for CDs/DVDs and a light source for BDs in the light emitting system 200, and the second beam splitter 204 and the monitor photodetector 205 are shared by CD/DVD and BD optical systems. Also, one first beam splitter 103 is shared in the light transmission system 100, and all elements of the light receiving system 300 are shared regardless of the type of media. The optical pickup device may have a simple structure in which the number of components may be reduced, so that there may be more freedom in designing the optical pickup device and component costs may be reduced. In particular, the number of components may be reduced so that the optical pickup device may be made smaller than the conventional optical pickup device.

Figure 2:
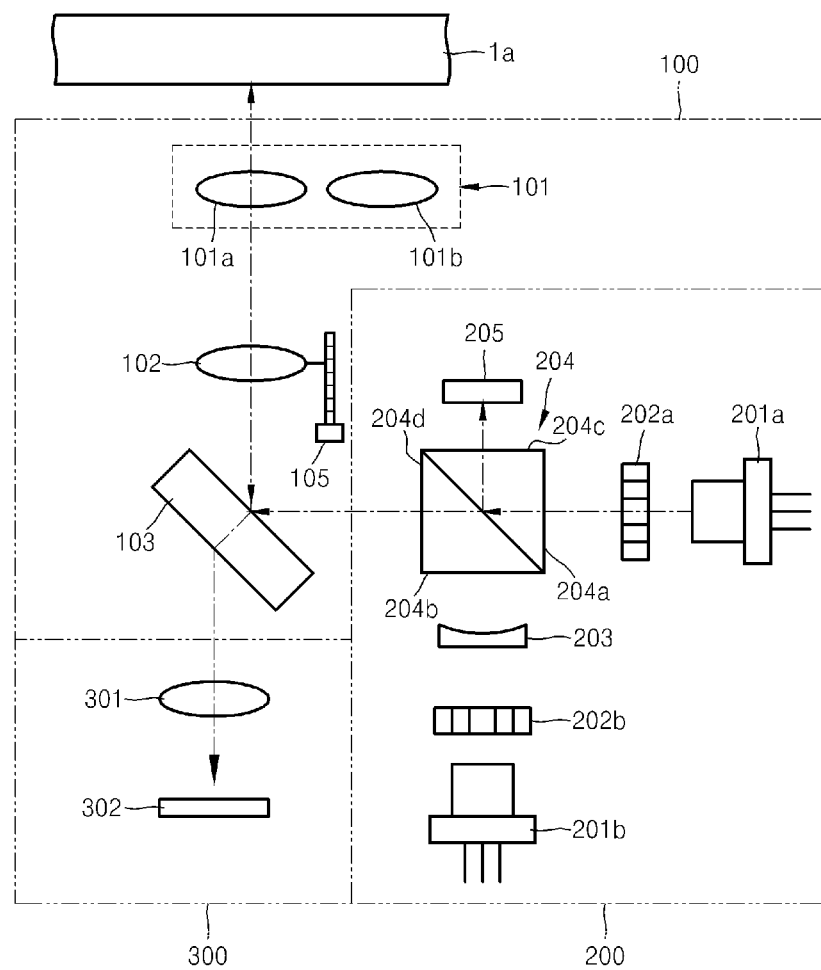
FIG. 2 is a diagram illustrating an example of an optical path when a compact disc/digital versatile disc (CD/DVD) medium is used in the optical pickup device illustrated in FIG. 1.
Figure 3:
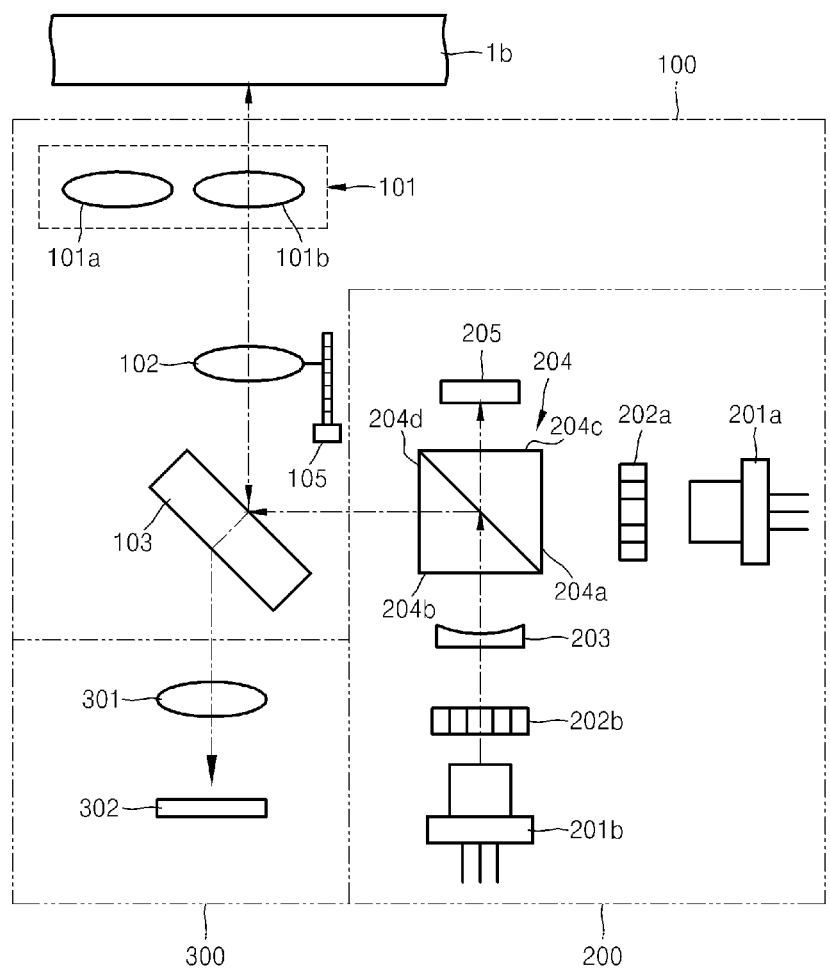
FIG. 3 is a diagram illustrating an example of an optical path when a Blu-ray Disc (BD) medium is used in the optical pickup device illustrated in FIG. 1.

FIG. 2 illustrates an example of an optical path when a CD/DVD medium 1a is used in the optical pickup device illustrated in FIG. 1. FIG. 3 illustrates an example of an optical path when a BD medium 1b is used in the optical pickup device illustrated in FIG. 1.

Referring to the example in FIG. 2, when the CD/DVD medium 1a is used, the first objective lens 101a is disposed on the optical axis X1, and the first light source 201a having a twin laser diode (LD) structure is used as a light source. When laser light is emitted from the first light source 201a of the light emitting system 200, three beams are formed while passing the first diffraction element 202a and are incident on the first incidence surface 204a of the second beam splitter 204. In one example, a part of the light may be reflected and proceeds toward the monitor photodetector 205 via the first emission surface 204c. Most of the light is incident on the first beam splitter 103 via the second emission surface 204d, sequentially passed through the collimating lens 102 and the first objective lens 101a, and then is incident on the medium 1a. Light reflected from the medium 1a passes the first objective lens 101a, the collimating lens 102, and the first beam splitter 103 and then is incident on the photodetector 302 via the sensing lens 301. The second beam splitter may direct most of light from the optical systems toward the first beam splitter and allow a part of light to be incident on the monitor photodetector.

Referring to the example in FIG. 3, when the BD medium 1b is used, the second objective lens 101b is disposed on the optical axis Xl, and the second light source 201b is used as a light source. When laser light is emitted from the second light source 201b, three beams are formed while passing the second diffraction element 202b and the coupling lens 203. The beams are incident on the second incidence surface 204b of the second beam splitter 204 and then a part thereof is transmitted and proceeds toward the monitor photodetector 205 via the first emission surface 204c. Most of the beam is reflected, is incident on the first beam splitter 103 via the second emission surface 204d, is sequentially passed through the collimating lens 102 and the second objective lens 101b, and then is incident on the medium 1b. Light reflected from the medium 1b passes the second objective lens 101b, the collimating lens 102, and the first beam splitter 103 and then is incident on the photodetector 302 via the sensing lens 301. For example, the coupling lens 203 is an optional element that may reduce an optical distance between the coupling lens 203 and the BD reproduction optical system due to having an appropriate negative power, reducing the optical distance between the coupling lens 203 and the BD reproduction optical system and an optical distance between the coupling lens 203 and the CD/DVD optical system.

When the optical system is driven to correspond to one selected from among the CD/DVD medium 1a and the BD medium 1b, the position of the collimating lens 102 is varied according to the medium selected, and the collimating lens 102 allows a focus having an appropriate size to be formed on the selected medium.

In one example, one collimating lens is used for three wavelengths. Thus, a BD optical system having an optical structure with a large magnification may be used together with a CD/DVD optical system by using a coupling lens so that only one monitor photodetector and one photodetector may be used. In one example, a concave lens having a negative power is used in the BD optical system, shown as the coupling lens 203, to use one collimating lens. Thus, a large magnification of a BD light emitting system may be used to adjust focus.

Figure 4:
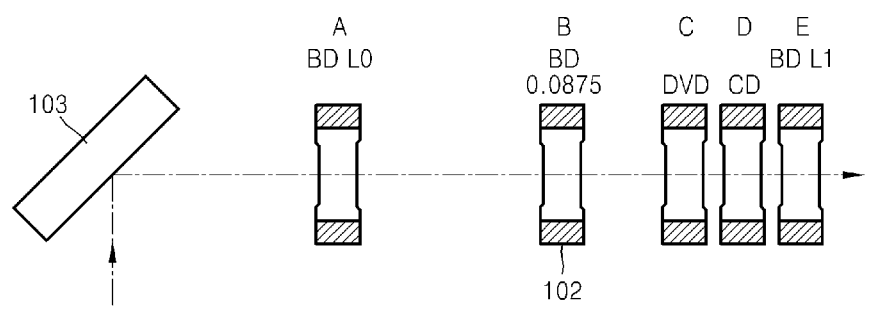
FIG. 4 is a diagram illustrating an example of a relative position of a collimating lens according to media, in the optical pickup device of FIG. 1.

FIG. 4 illustrates an example of a relative position of a collimating lens according various types of media, in the optical pickup device of FIG. 1. The collimating lens 102 is disposed on a path of light reflected from the first beam splitter 103, i.e., on the optical axis X1. In FIG. 4, "B" denotes an initial position and corresponds to a BD having a thickness of 0.0875 mm. "A" denotes a position corresponding to a first layer L0 of the BD. "C" denotes a DVD, "D" denotes a CD, and "E" denotes a position corresponding to a second layer L1 of the BD.

In other words, in one example, the position of the collimating lens 102 disposed on the optical axis X1, as illustrated in FIG. 4, is adjusted according to the type of media to obtain an optimum focus. The optimum focus may be formed according to the position of the collimating lens 102. Meanwhile, the coupling lens 102 may reduce the overall optical distance of the BD optical system due to an optical characteristic that is explained below with reference to FIG. 5.

Figure 5:
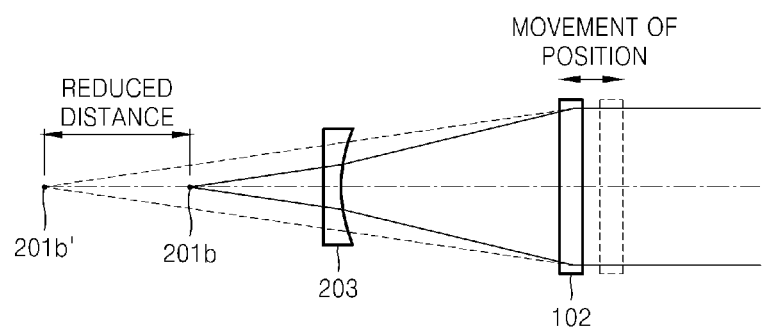
FIG. 5 is a diagram illustrating an example of a reduction in a physical distance when the optical pickup device of FIG. 1 includes a coupling lens.

FIG. 5 illustrates an example of the reduction in a physical distance when including the coupling lens 203 in the BD optical system.

The coupling lens 203 disposed in front of the second light source 201b, i.e., after a light source for the BD optical system, has a negative power. The presence of the coupling lens 203 allows the overall physical distance to be reduced and sensitivity in positioning of the collimating lens 102 to be reduced. In FIG. 5, 201b' denotes a position of a light source when the coupling lens 203 is not present, and 201b denotes a position of the light source when the coupling lens 203 is present. As shown in this example, the overall optical distance may be reduced, and the moving distance of the collimating lens 102, i.e., the quantity of movement of the collimating lens 102, may be reduced. A rate K of reduction in the quantity of movement of the collimating lens 102 may be expressed using the following Equation:

$$K=(f2/f3)^2 \qquad (1)$$

f1: focal length of the coupling lens 203
f2: focal length of the collimating lens 102
f3: combined focal length of f1+f2
K: quantity of movement reduced compared to f3

The following optical configuration may be obtained from expressions between these optical elements.

f1: −13.4 mm
f2: 11.56 mm
f3: 14.5 mm
K=0.64

This result shows, for example, that the quantity of movement of the coupling lens 203 that occurs when the coupling lens 203 is used together with the collimating lens 102, may be reduced to 0.64 times the quantity of movement of the collimating lens 102 that occurs when only the collimating lens 102 is used.

FIGS. 6A through 6F are graphs showing the examples of the result of simulation of the optical pickup device of FIG. 1. In this simulation, the temperature of the optical pickup device is set as 35° C., a wavelength of light emitted is set as 405 nm, and the thickness of a medium (disc) is set as 0.0875 mm. In FIGS. 6A through 6F, negative values (on a vertical axis) represent movement toward a light source, and positive values (on a vertical axis) represent movement toward an objective lens.

In each of the graphs of FIGS. 6A through 6F, f3 represents the result of an optical system in which a collimating lens CL and the coupling lens 203 are used, and f=14.5 represents the result of a conventional optical system including only the collimating lens CL having a focal length of 14.5 mm without the coupling lens 203.

Figure 6A:
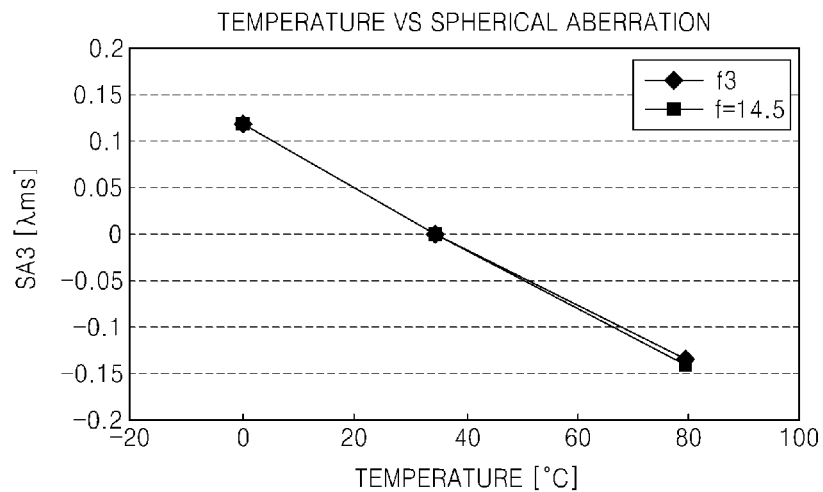
FIGS. 6A through 6F are graphs showing example results of simulation of the optical pickup device of FIG. 1.

FIG. 6A illustrates a variation of spherical aberration according to temperature. As illustrated in FIG. 6A, spherical aberration of the optical system f3 in which the coupling lens 203 is used, may be smaller than that of the conventional optical system f=14.5 in which the coupling lens 203 is not used.

Figure 6B:
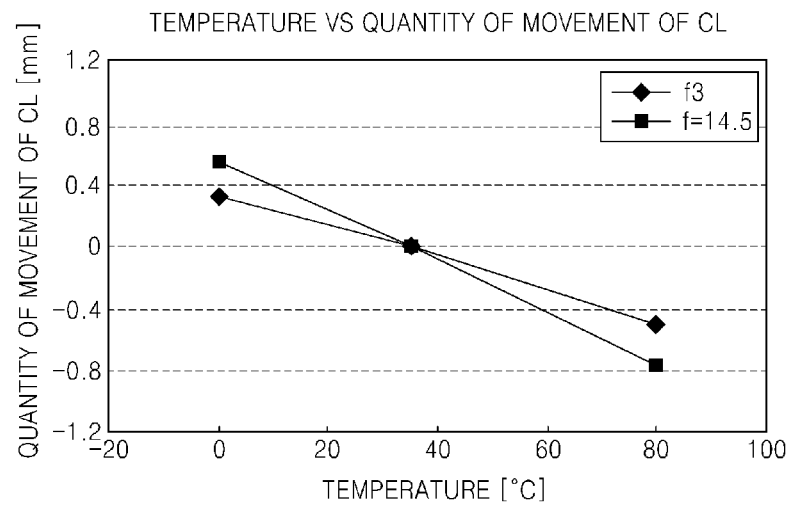

FIG. 6B illustrates a variation of the quantity of movement of the collimating lens according to temperature. As illustrated in FIG. 6B, the quantity of movement of the optical system f3 in which the coupling lens 203 is used, may be relatively small compared to that of the conventional optical system f=14.5 in which the coupling lens 203 is not used.

Figure 6C:
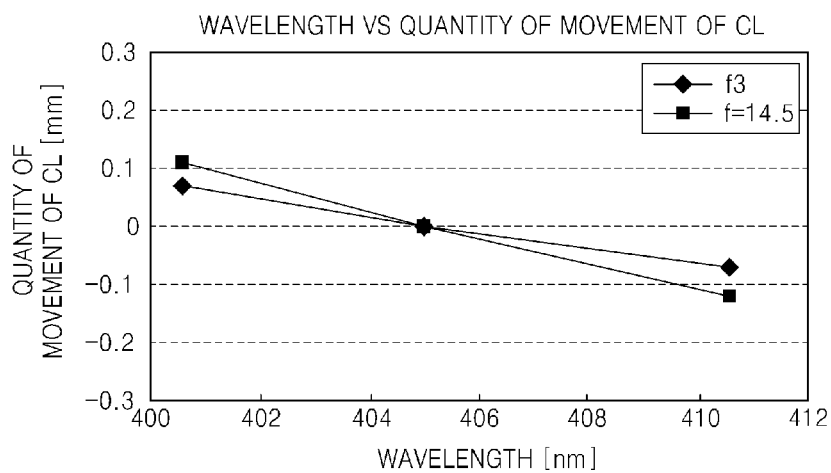

FIG. 6C illustrates a variation of the quantity of movement of the collimating lens according to wavelengths. As illustrated in FIG. 6C, the quantity of movement of the optical system f3 in which the coupling lens 203 is used, may be relatively small compared to that of the conventional optical system f=14.5 in which the coupling lens 203 is not used.

Figure 6D:
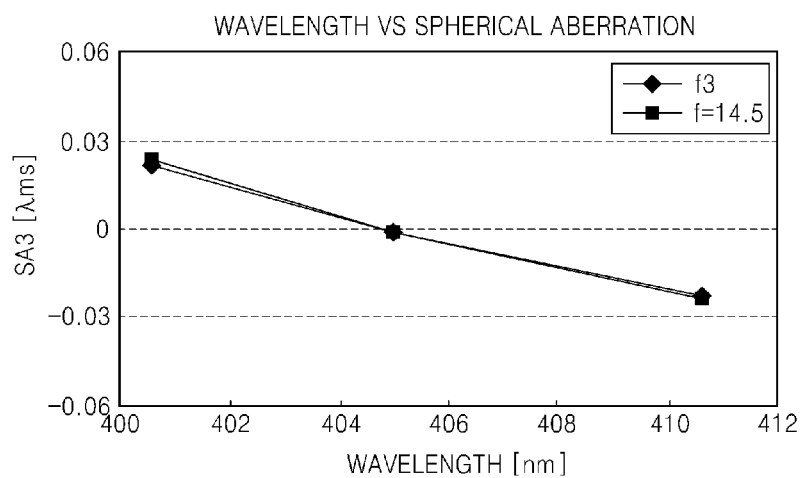

FIG. 6D illustrates a variation of spherical aberration of the collimating lens according to wavelengths. As illustrated in FIG. 6D, spherical aberration of the optical system f3 in which the coupling lens 203 is used, is not greater than but may be relatively small compared to that of the conventional optical system f=14.5 in which the coupling lens 203 is not used.

Figure 6E:
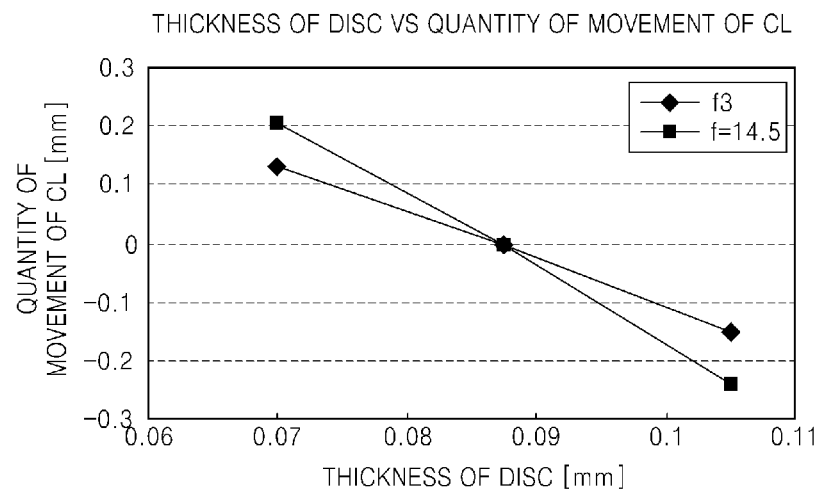

FIG. 6E illustrates a variation of the quantity of movement of the collimating lens according to thicknesses of a medium (disc). As illustrated in FIG. 6E, the quantity of movement of the optical system f3 in which the coupling lens 203 is used, may be significantly smaller than that of the conventional optical system f=14.5 in which the coupling lens 203 is not used.

Figure 6F:
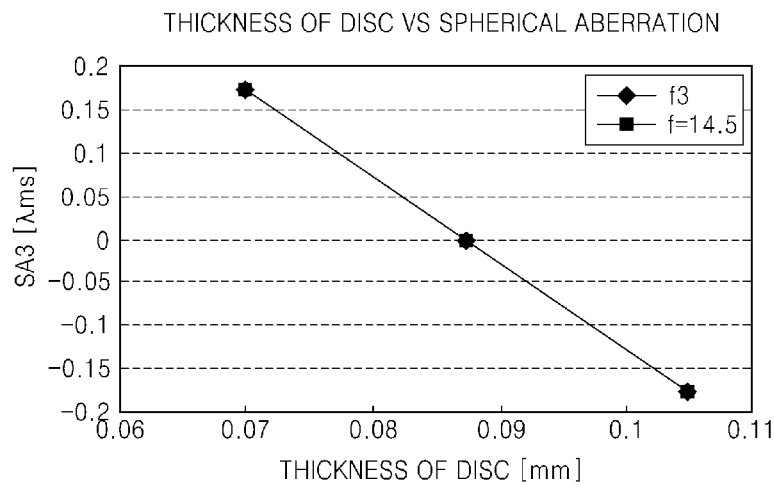

FIG. 6F illustrates a variation of spherical aberration of the collimating lens according to thicknesses of the disc. As illustrated in FIG. 6F, spherical aberration of the optical system f3 in which the coupling lens 203 is used, may be nearly the same as that of the conventional optical system f=14.5 in which the coupling lens 203 is not used.

Figure 7:
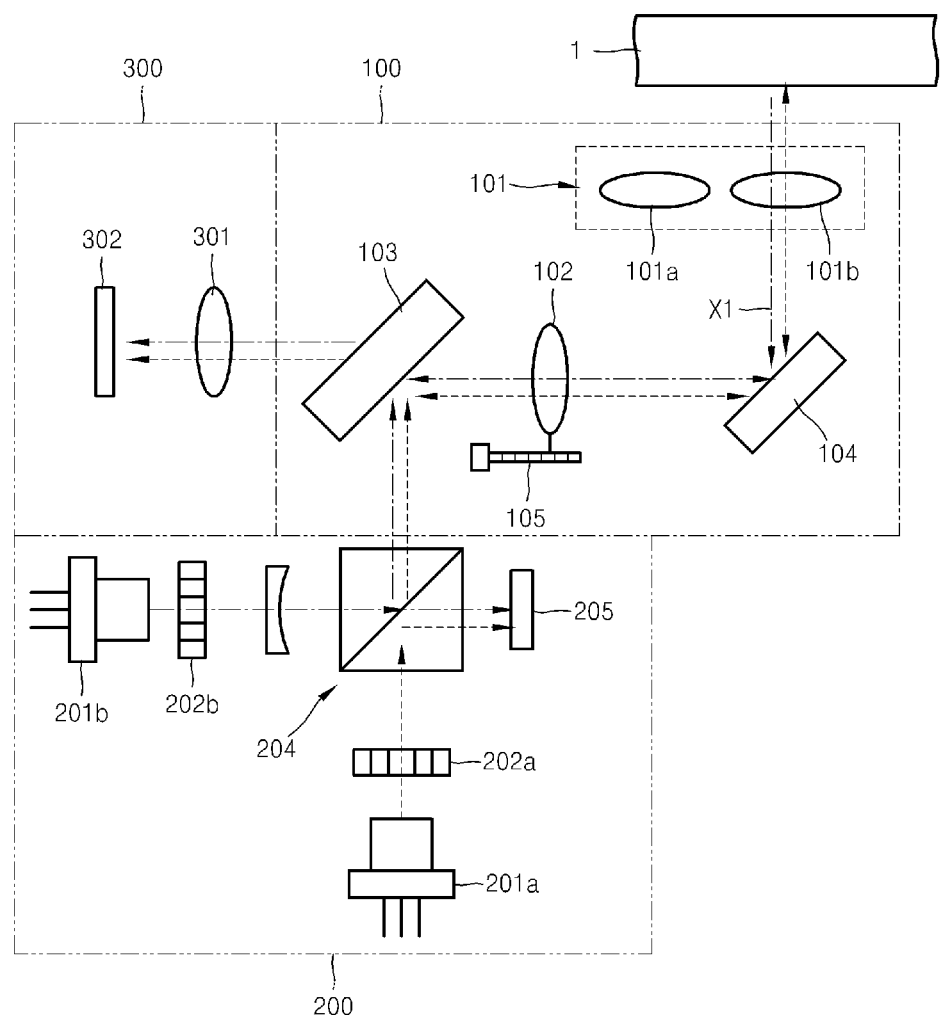
FIG. 7 is a diagram illustrating a schematic structure of another example of an optical pickup device.

FIG. 7 illustrates a modified example of the optical pickup device shown in FIG. 1. In particular, FIG. 7 illustrates a schematic structure of an example of an optical pickup device, wherein the optical pickup device is disposed parallel to a plane of a medium. A path-changing mirror 104 is disposed between the collimating lens 102 and the objective assembly 101.

Referring to FIG. 7, the optical pickup device includes a light transmission system 100 that directly corresponds to a medium 1, a light emitting system 200 that is configured to supply light for reproducing data from and/or writing data in the medium 1, and a light receiving system 300 configured to receive light reflected from the medium 1 and generate an electrical reproduction signal to reproduce data from the medium 1, like in FIG. 1.

The light transmission system 100 includes the objective lens assembly 101 that is disposed on an optical axis X1 and that extends in a direction parallel to the medium 1 and that corresponds to the medium 1, a first beam splitter 103 having a plate-shaped structure, and a collimating lens 102 disposed between the objective lens assembly 101 and the first beam splitter 103. The objective lens assembly 101 includes first and second objective lenses 101a and 101b that correspond to a plurality of media. The first objective lens 101a may correspond to CDs/DVDs, and the second objective lens 101b may correspond to BDs. The first and second objective lenses 101a and 101b are disposed parallel to the medium 1, and their optical axes are parallel with respect to the optical axis X1 and are perpendicular to the medium 1. The optical path is changed by the path-changing (optical path refraction) mirror 104 described above as further described below.

The path-changing mirror 104 is disposed between the collimating lens 102 disposed on an optical axis of the collimating lens 102 in a direction parallel to the medium 1 and the objective lens assembly 101 disposed on the optical axis X1, which is perpendicular to the medium 1. As described above, the objective lens assembly 101 moves in a reciprocating manner so that an objective lens can be disposed on the optical axis X1 of the light transmission system 100 according to the type of media.

As described above, in the optical pickup device, a CD/DVD optical system and a BD optical system share a collimating lens and a beam splitter of a light transmission system. In this structure, the position of the collimating lens may be adjusted according to each medium. In another example, in addition to a light transmission system-sharing structure, a coupling lens may be added to a light emitting unit. This may cause an increase in magnification by using a coupling lens in a BD optical system to share the collimating lens together with the DVD optical system having a small magnification. Thus, a spot size may be reduced, and focused by using the coupling lens. As a result, the number of components of the optical pickup device may be reduced so that the optical pickup device may be light-weight and miniaturized and costs thereof may be reduced.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical pickup device, comprising:
   a light emitting system comprising a plurality of optical systems respectively corresponding to a plurality of media, the light emitting system comprising first and second light sources respectively corresponding to the plurality of media, wherein the second light source is configured to provide a Blu-ray Disc (BD) light;
   a light receiving system comprising a first photodetector configured to convert light reflected from the plurality of media into an electrical signal;
   a coupling lens disposed in a BD optical system of the plurality of optical systems, to reduce an optical distance in the BD optical system by adjusting an optical magnification;
   a light transmission system shared by the light emitting system and the light receiving system, the light transmission system configured to:
   direct light from the light emitting system toward a medium; and
   direct light reflected from the medium toward the light receiving system, the light transmission system comprising:

a first beam splitter corresponding to the light emitting system and the light receiving system; and a position-changing collimating lens which is repositioned according to the plurality of media; and a second beam splitter configured to receive light from each of the first and second light sources and directly convey portions of light received from each of the first and second light sources to a second photodetector and the first beam splitter, wherein the first beam splitter conveys the received portions of the first and second lights to the collimating lens.

2. The optical pickup device of claim 1, wherein the plurality of optical systems comprise a compact disc/digital versatile disc (CD/DVD) optical system.

3. The optical pickup device of claim 1, wherein:
the light emitting system comprises the second beam splitter, which is shared by the optical systems.

4. The optical pickup device of claim 2, wherein:
the light emitting system comprises the second beam splitter shared by the optical systems.

5. The optical pickup device of claim 1, wherein:
the second photodetector is disposed at a side of the second beam splitter; and
the second beam splitter is further configured to:
   direct most of light from the optical systems toward the first beam splitter; and
   allow a part of light to be incident on the second photodetector.

6. The optical pickup device of claim 1, wherein:
an optical axis of the collimating lens is disposed parallel to the medium; and
an optical path refraction mirror is further disposed between an objective lens assembly and the collimating lens.

7. The optical pickup device of claim 1, further comprising:
an optical path refraction mirror disposed between an objective lens assembly and the collimating lens, wherein
an optical axis of the collimating lens is disposed parallel to the medium, and
the objective lens assembly comprises a first objective lens corresponding to a first media and a second objective lens corresponding to a BD.

8. An optical pickup device, comprising:
an objective lens assembly comprising a plurality of objective lenses respectively corresponding to a plurality of media;
first and second light sources respectively corresponding to the plurality of media, wherein the second light source is configured to provide a Blu-ray Disc (BD) light;
a first photodetector configured to detect light reflected from the media;
a collimating lens disposed on an optical path between the objective lenses and the first and second light sources, the positioning of the collimating lens on an optical axis being adjustable according to the plurality of media;
a first beam splitter disposed between the collimating lens and the first and second light sources, the first beam splitter configured to:
   direct light reflected from the media toward the first photodetector; and
   direct light from the first and second light sources toward the collimating lens; and
a second beam splitter disposed between the first beam splitter and the first and second light sources, the second beam splitter configured to receive light from each of the first and second light sources and directly convey portions of light received from each light source to a second photodetector and the first beam splitter; and a coupling lens positioned between the second light source and the second beam splitter, to reduce the optical distance between the second light source and the second beam splitter, by adjusting an optical magnification.

9. The optical pickup device of claim 8, wherein:
the second photodetector is disposed at a side of the second beam splitter.

10. The optical pickup device of claim 8, further comprising an optical path refraction minor disposed between the objective lens assembly and the collimating lens.

11. The optical pickup device of claim 8, wherein the first and second light sources comprise a light source for compact discs/digital versatile discs (CDs/DVDs).

12. The optical pickup device of claim 9, wherein the first and second of light sources comprise a light source for compact discs/digital versatile discs (CDs/DVDs).

13. The optical pickup device of claim 10, wherein the first and second light sources comprise a light source for compact discs/digital versatile discs (CDs/DVDs).

14. The optical pickup device of claim 11, wherein the second light source corresponds to DVD media.

15. The optical pickup device of claim 12, wherein the second light source corresponds to DVD media.

16. An optical pickup device comprising:
first and second light sources, wherein the second light source is configured to provide a Blu-ray Disc (BD) light;
first and second photodetectors that are each configured to detect light received through an optical path from each of the first and second light sources;
first and second beam splitters that are each configured to split a received beam of light;
a variable-position collimating lens configured to collimate a received beam of light;
first and second objective lenses configured to focus light from the first and second light sources, respectively, on first and second recording media; and
a coupling lens configured to reduce the optical distance between the BD light source and the first beam splitter through optical magnification, wherein:
the first beam splitter receives light from each of the first and second light sources and directly conveys portions of the light received from each light source to the first photodetector and the second beam splitter,
the second beam splitter receives light from each of the first and second light sources, as conveyed by the first beam splitter, and conveys the lights to the variable-position collimating lens.

17. The optical pickup device of claim 16, wherein:
the position of variable-position collimating lens is varied to respectively focus light from the first and second light sources onto the first and second recording media through the first and second objective lenses, and
the second photodetector receives light from the first and second light source reflected from the first and second recording media, respectively, and conveyed through the first and second objective lenses, respectively, the variable-position collimating lens, and the second beam splitter.

18. The optical pickup device of claim 1, wherein the coupling lens is configured to reduce a movement distance of the position-changing collimating lens according to the BD optical system.

19. The optical pickup device of claim 8, wherein the coupling lens reduces an amount of moving distance of the collimating lens according to the second light source.

20. The optical pickup device of claim 16, wherein the coupling lens reduces an amount of moving distance of the collimating lens according to the second light source.

21. The optical pickup device of claim 1, wherein the coupling lens is a concave lens.

22. The optical pickup device of claim 8, wherein the coupling lens is a concave lens.

23. The optical pickup device of claim 16, wherein the coupling lens is a concave lens.

* * * * *